Nov. 2, 1943.  J. W. DYER ET AL  2,333,364
AIRCRAFT
Filed July 26, 1935   4 Sheets-Sheet 3

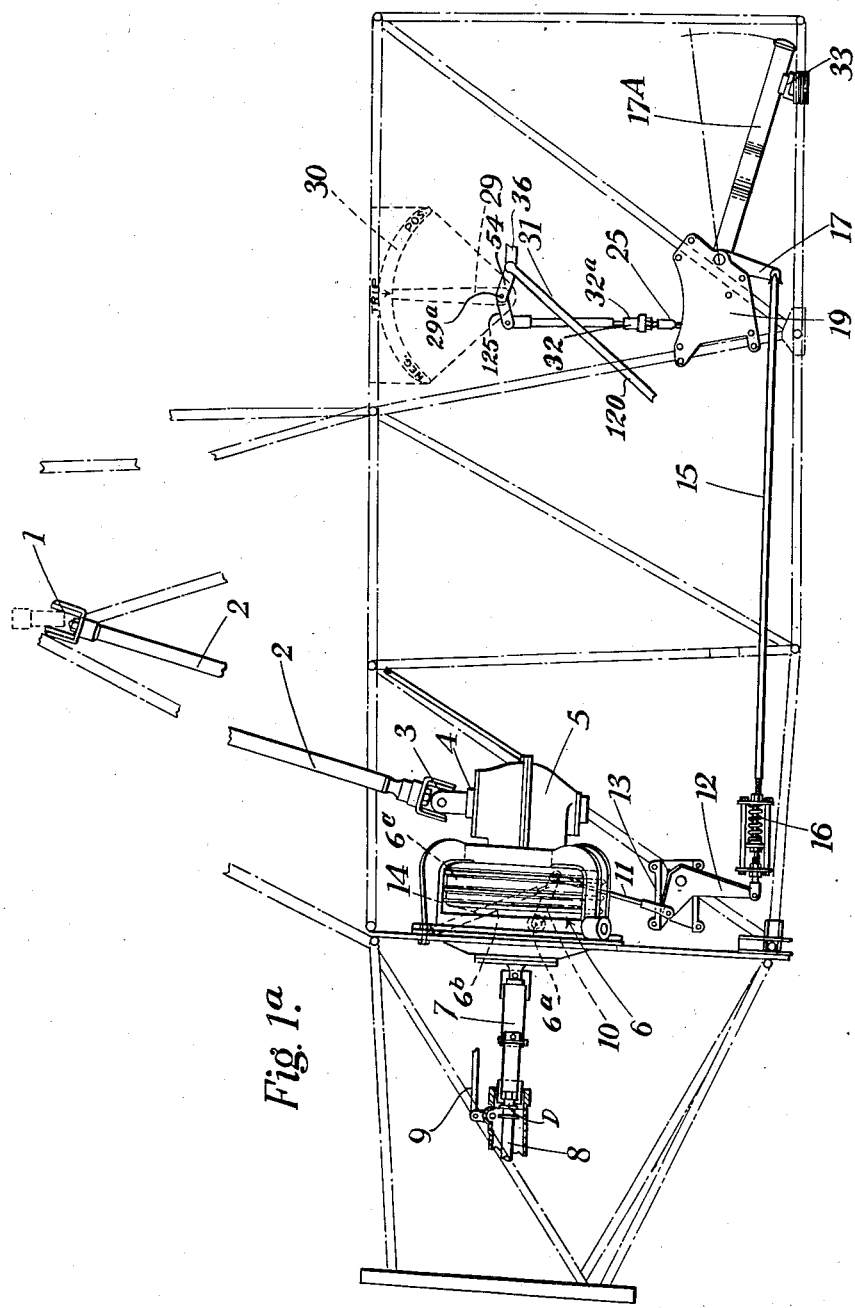

INVENTORS
J. W. Dyer
D. Kay
BY
Chas. J. Williamson
ATTORNEY

Nov. 2, 1943.  J. W. DYER ET AL  2,333,364
AIRCRAFT
Filed July 26, 1935  4 Sheets-Sheet 4

Patented Nov. 2, 1943

2,333,364

UNITED STATES PATENT OFFICE 2,333,364

AIRCRAFT

John William Dyer and David Kay, Edinburgh, Scotland, assignor to Kay Gyroplanes Limited, Edinburgh, Scotland Application July 26, 1935, Serial No. 33,396
In Great Britain July 27, 1934

22 Claims. (Cl. 244—18)

This invention relates to aircraft of the kind in which the lift is derived wholly or partly from an overhead rotative wing-system, commonly known as a "rotor," which turns about a more or less vertical axis, and more particularly to aircraft of this kind in which the angles of incidence of the rotor blades with the air stream, i. e. the angles at which they are set to their general plane of rotation, are variable so as to enable the lifting action to be changed to suit the conditions of the moment. The invention also has particular reference to such aircraft in which the rotor is auto-rotative, i. e., rotated by the action of the flight wind.

In taking-off with a machine of this character the blades are set in a position in which they have no angle of incidence or are at negative incidence, and they are then mechanically rotated, for example, by being coupled to the power unit of the machine. As soon as the pilot considers that the blades are rotating at a sufficiently high speed to be capable of giving the required lifting action, he adjusts them until they have a positive angle of incidence, increases the speed of the usual airscrew, and the machine subsequently rises. Clearly, however, before the aircraft takes off it will be necessary to disconnect the rotor from the power unit, since if the rotor continued to be positively driven the torque reaction between the rotor and fuselage would cause the latter to rotate in the opposite direction to the rotor. To enable this necessary disconnection to be effected it is the present practice to provide a control whereby the pilot can connect and disconnect the rotor drive at will.

According to the present invention, therefore, aircraft of the kind referred to are characterized by the combination of means for varying the angles of incidence of the rotor blades and means for ensuring that the rotor shall be positively disconnected from its driving means as soon as the blades have been adjusted or set to predetermined angles of incidence.

Expressed more specifically we provide means for varying the angles of incidence of the rotor blades, mechanism for driving the rotor, disconnectible means in said mechanism and means for operatively interconnecting the means for varying the angles of incidence of the blades to said disconnectible means, the arrangement being such that as soon as the rotor blades have been adjusted or set to predetermined angles of incidence, the said disconnectible means is automatically operated to render the mechanism for driving the rotor inoperative.

In a convenient construction we provide mechanism for varying the angles of incidence of the rotor blades, a control for actuating said mechanism, means for operatively interconnecting the rotor to a driving member, a clutch included in said means, a control for operating the clutch, and means for interconnecting the control for actuating the incidence-varying mechanism to the clutch control in such a manner that when the incidence control has been adjusted into a predetermined position it automatically brings about the release of the clutch control from the position in which it has acted to engage the clutch.

In such a construction the rotor blades are adapted to be driven by mechanism including a clutch arranged to be operated by a control, the clutch control being associated with means which retains it in the position in which the clutch is engaged until such time as the said means is actuated to release the control under the action of the incidence control.

The said retaining means may consist of a catch or pawl adapted to engage with the clutch control when the latter is in the position in which the clutch is engaged, said catch or pawl tending to move out of engagement with the clutch control, means being provided which normally holds the catch or pawl in a position to engage the clutch control and which is interconnected with the incidence control in such a manner that when the latter is moved into a predetermined position said means is immediately moved in such a direction as to allow the catch or pawl to disengage the clutch control. The pawl is preferably normally forced into a position in which it can engage with a ratchet associated with the clutch control under the action of spring means, said pawl being supported normally in its ratchet engaging position adjacent to a member which when moved in one direction by the movement of the incidence control allows the pawl to move into a position in which it can no longer engage with the ratchet until the said member has been returned into its original position.

As an additional safeguard, the pawl is mounted for movement towards and away from the ratchet in such a manner that in the event of the spring means breaking the pawl will immediately move into a position in which it cannot engage with the ratchet. The member cooperating with the pawl may consist of a slidable bar which is coupled to means operatively connecting it to the incidence control through a member which allows the said bar to be moved so as to render the pawl inoperative without disturbing the incidence control.

One constructional form of the present invention is shown, by way of example only, on the accompanying drawings, whereon:

Figure 1 is a side elevation of the front end of the aircraft of the type above referred to, but with the shell or skin of the aircraft being shown in dotted lines in order that the detailed construction and arrangement of parts may be viewed more clearly and with the lifting or rotor blades broken for convenience of disclosure;

Fig. 1ª shows diagrammatically the means for controlling the rotor drive;

Figure 1:
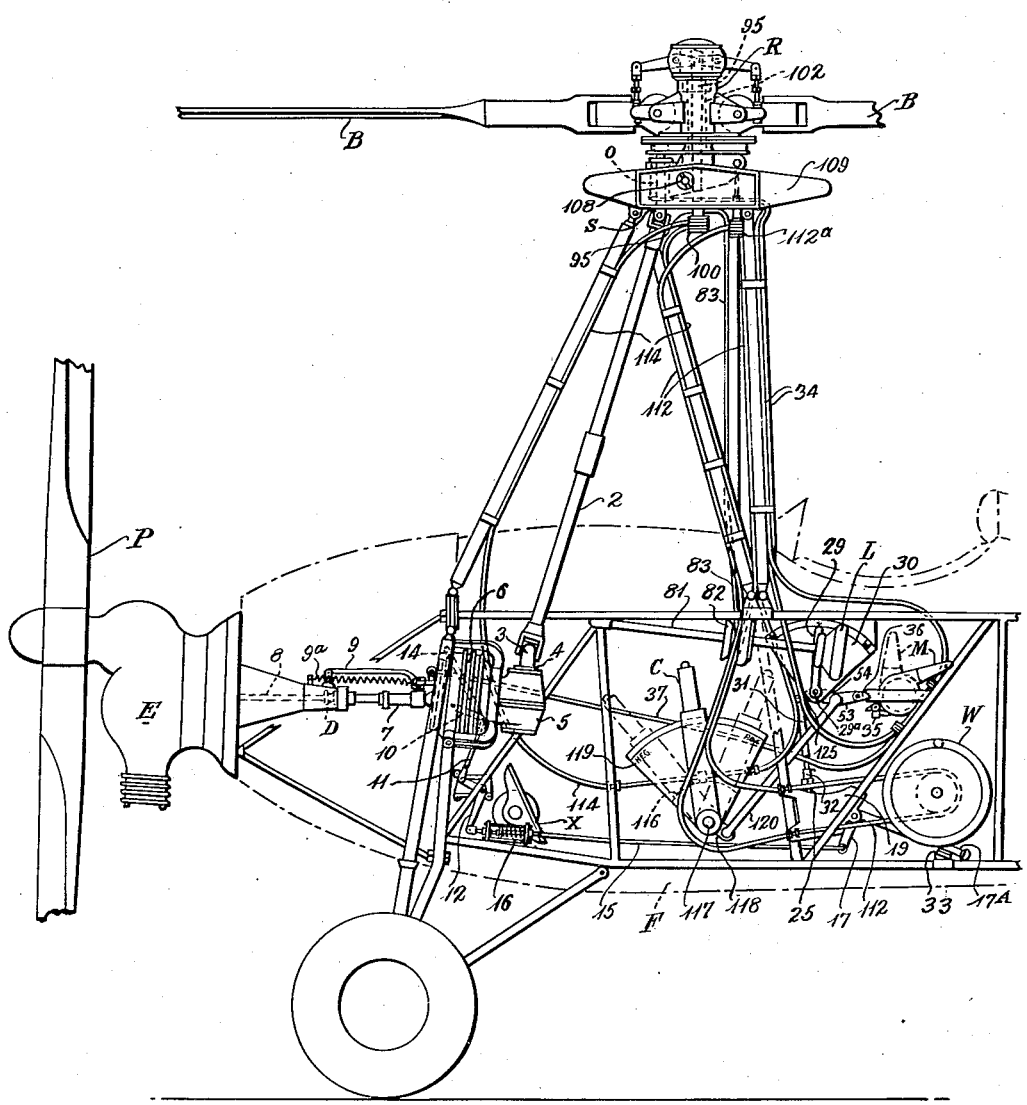

Referring first to Figs. 1 and 1ª:

The aircraft to which the present invention is applicable may generally comprise the usual fuselage F, having a rotor mast rising from the top side thereof to support a rotor R, which carries the lifting and sustaining blades B; the mast consisting of supporting struts suitably arranged and connected with the fuselage at their lower ends and supporting at their upper ends a hollow casing 109 upon which the rotor R and its supporting axle 102 are mounted for fore-and-aft tilting movement and for lateral tilting movement, which is more particularly described and shown in our U. S. Patents Nos. 2,097,117 and 2,097,118, which were co-pending herewith. The fore-and-aft tilting is controlled from a hand-wheel W disposed in the cockpit of the fuselage within convenient reach of the pilot and is operatively connected with the reaches of a cable 112 which is wound around a drum pulley 112ª.

The lateral tilting of the rotor R on the supporting structure 109 is accomplished by a wheel L disposed in the cockpit adjacent to the pilot's seat and mounted on a shaft 81, which has a pulley 82 over which is trained a cable 83. The cable 83 is wound about a pulley drum, not shown, to rotate a shaft 108 to effect the lateral tilting of the mast 102 and the rotor R supported thereby according to the direction of rotation of the shaft 108.

The rotor hub R, on which the rotor blades B are mounted, concentrically surrounds an upstanding axle 102 on the masthead 109 in which it is journalled, as disclosed in our patents mentioned above; and the blades B are adjustable to vary their angle of incidence by rotation of a spindle 95 mounted within the axle 102 by means of a pulley drum 100 on the lower end thereof—all of which is more particularly described and shown in detail in our co-pending application, Serial No. 33,398. The pulley drum 100 is rotated by a cable 114 wound thereon and has its reaches led down legs or struts of the mast into the cockpit (see Figure 1), from which they are led in opposite directions to the grooved surface of a quadrant 116, fixed on a rotatable spindle 117, journalled in bearings carried by the supporting structure of the fuselage, said spindle and quadrant being oscillatable through the medium of the control lever C.

As shown in Figure 1, lever C may be moved to positions varying the angle of incidence of each of the rotor blades by properly positioning the lever C with respect to the stationary quadrant 119. The lever C may be located in the running-up or no-lift position by positioning it at the forward or left-hand end of the quadrant 119, as viewed in Figure 1, and may be located in the maximum angle of incidence or lifting position by moving it to the rear or right-hand end of the stationary quadrant 109, as viewed in Figure 1. For normal flight positions at any desired angle of incidence, the lever may assume various positions intermediate the ends of the quadrant 119, movement of the lever C in either direction transmitting a corresponding movement to the cable 114, which will correspondingly operate the drum 100 and the spindle 95.

Movement of lever C is also transmitted to a short-arm lever 118 through a link 120 through the lever 54 fixed to the shaft 29ª of the pointer 29, of blade incident indicator 30. Fast to the pointer or its shaft 29ª is a lever arm 125 to which is attached one end of a tie-bar 31, for the purpose of releasing the manually operatable clutch 6 to disconnect the drive from a motor E or other source of power from the rotor R, when the angle of incidence of the rotor blades has been increased in a predetermined amount.

Now, having described the general characteristics and operation of the machine to which, as one example, the present invention is applicable, the latter will now be described in detail.

According to the present invention, the rotor R is adapted to be driven from the engine E (which may also actuate the screw propeller P), for the purpose of running up the motor R to effect direct take-off while the craft is stationary on the ground and while the blades B are in negative or no-lift position; and, further, interconnecting means is provided between the blade incidence varying means and the engine drive to disconnect the same when the blade incidence varying means has moved the blades from negative or no-lift position to a predetermined positive or lifting position. To this end, the rotor R is driven from the engine in the manner described in another of our co-pending applications Serial No. 33,397, through an eccentrically arranged starter pinion o, the spindle s of which is connected by a universal joint 1 to a telescopic rotor drive shaft 2, the lower end of the latter being connected by a universal joint 3 to the output shaft 4 of a bevel gear box 5. The input shaft (not shown) of the bevel gear box is connected to one of the elements of a friction clutch 6, the other element of which is connected to the tailshaft 8 of the engine E through a tubular shaft 7, in which one end of the tailshaft 8 is slidable to connect and disconnect said shafts through the medium of a dog-clutch D, the adjacent end of the shaft 8 being provided with one element of dog clutch and the other being on the tubular take-off shaft 7. The dog-clutch is biased by spring 9ª to be normally disengaged but is engageable by means of a clutch lever 9 adapted to slide the shaft 8 in both directions to engage and disengage the dog-clutch. The control member M for engaging the starter pinion with its cooperating gear wheel on the rotor hub R also acts to control the engagement and disengagement of the said dog-clutch, the arrangement being fully described in the specification of the above mentioned co-pending patent application Ser. No. 33,397. The drive from the engine E to the rotor-hub R is thus transmitted through the dog-clutch, shafts 8 and 7, friction clutch 6, gear box 5, shaft 2, spindle s and pinion o.

The friction clutch 6 is actuated by a lever 10 fast on the rocker-shaft 6ᵃ which, through the usual construction not shown, moves the clutch cone or sliding part 6ᵇ into and out of engagement with the clutch head 6ᶜ. To distal end of the lever 10 is connected to the upper end of a rod 11 and the lower end of said rod is connected to one arm of a bell-crank lever 12 pivoted on a bracket 13 carried by the fuselage structure. The lever 10 is biassed in the direction in which the clutch will be disengaged by means of a tension spring 14 and is pulled into the clutch-engaging position by a pull-rod 15 connected to the other arm of the bell-crank lever 12 through the spring-coupling 16, which acts to prevent harshness of engagement of the clutch elements.

Figure 3:
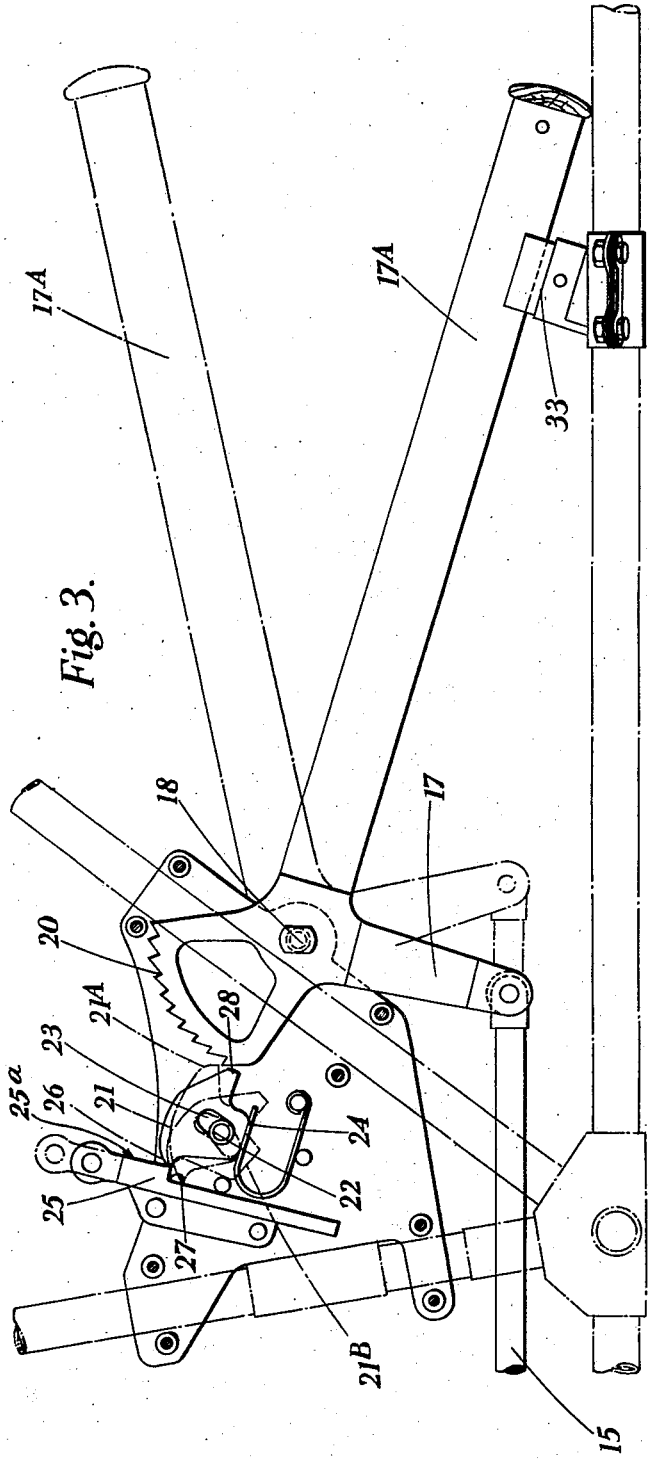
Fig. 3 is an elevation of the friction clutch control lever.
Figure 4:
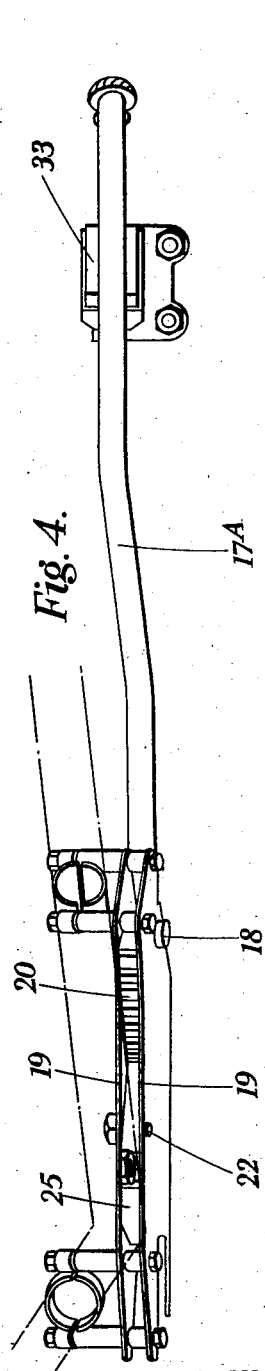
Fig. 4 is a plan view corresponding to Fig. 3.

Referring now to Figs. 3 and 4, the other end of the rod 15 is connected to a ratchet member 17 to which a hand lever 17A, disposed within reach of the pilot, is connected. Said member is pivoted at 18 between two supporting plates 19 and is provided at one end with ratchet teeth 20 which are adapted to be engaged when required by a pawl 21 loosely carried by a pivot pin 22 engaging an elongated slot 23 in the pawl.

Figure 2:
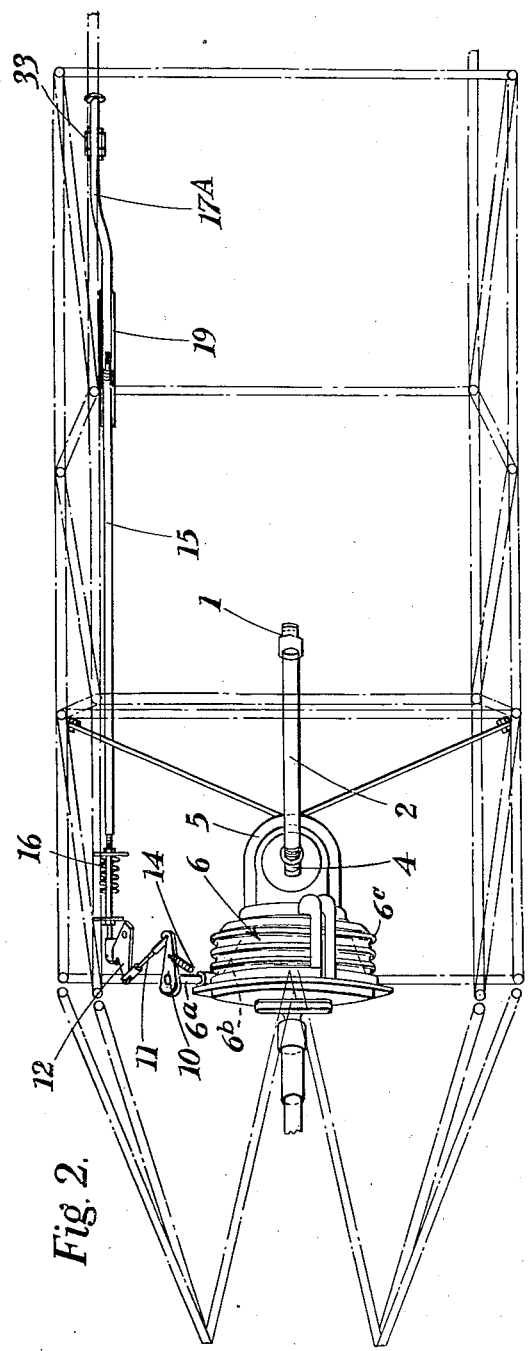
Fig. 2 is a plan view corresponding to Fig. 1ª.

When the friction clutch 6 (Fig. 1) is disengaged, the lever 17A, ratchet 17 and pawl 21 are in the positions shown in full in Fig. 3. The spring 24 tends to hold the pawl in this position because of the flat lower face of the pawl and in these conditions a bar 25, slidable between the plates 19, is free to slide from the position shown in full lines into the position shown in broken lines and vice versa. By means hereinafter described it is so arranged that when the incidence control lever C, described in the specification of another of our co-pending applications Serial No. 33,398, is in the position corresponding to negative incidence of the rotor blades B (i. e. left-hand position as viewed in Fig. 1), the sliding bar 25 is in the position shown in full lines, with the corner 26 of the pawl 21 just clear of or only lightly touching the surface 25ᵃ of the bar. In order to engage the clutch, the pilot raises the lever 17A, which causes the ratchet member 17 and the rod 15 to move towards the positions shown by the broken lines against the tension or bias of the spring 14, or equivalent means which maintains the clutch 6 normally disengaged. At the same time, the ratchet 20 bears on and presses down the pawl 21 against the resistance of the spring 24 and, by virtue of the shape and disposition of the slot 23 in the pawl, the resultant movement of the pawl is virtually a rotation about its corner 26 in a clockwise direction. It will be obvious that after a certain amount of movement of the pawl in this direction the ratchet teeth 20 could continue their downward movement past the corner 28 of the pawl without interference but for the spring 24 which lightly but continually presses the pawl against the longer sloping faces of the ratchet teeth. When the clutch 6 is fully engaged, the pilot releases the lever 17A which tends to resume its original position and so to reverse all the movements described above. The shorter face of one of the ratchet teeth 20, however, engages with the underside of the corner 28 of the pawl 21 and so tends to turn the pawl in a counter-clockwise direction, but is unable to do so as the bottom of the slot 23 is in engagement with the fixed pin 22 and the corner 26 of the pawl is in contact with the sliding bar 25. Therefore, since the pawl cannot reverse its motion it arrests the return movement of the ratchet and so holds the clutch in engagement. In order to release the clutch 6 the sliding bar 25 is moved to the position indicated by broken lines (Fig. 3) by means described hereinafter, in which position the recess 27 in the bar 25 is brought opposite to the corner 26 of the pawl which can then turn in a counter-clockwise direction about the pin 22 sufficiently under tension of spring 14, the weight of the lever 17ᵃ or other equivalent means, to allow the corner 28 to swing clear of the ratchet teeth as shown by the broken lines 21A in Fig. 3. The levers 17 and 17A and the rod 15 can then resume their original positions under the influence of the spring 14 (Figs. 1 and 2) and the clutch 6 is disengaged.

In the event of the spring 24 breaking, the pawl 21 would drop downwards until the top of the slot 23 engaged with the pin 22 and in this position, which is shown in dotted lines at 21B in Fig. 3, the pawl could not operate to hold the clutch 6 in engagement, nor could it restrict the movement of the sliding bar 25. This arrangement is important since, as described hereinafter, the bar 25 is coupled to the incidence control mechanism with the free movement of which there must be no interference.

In Fig. 1, there is shown, a pointer 29 working in conjunction with a scale 30 marked with divisions corresponding to the angles of incidence of the rotor blades B. As also disclosed in the specification of our other co-pending patent application Serial No. 33,398, the said pointer 29 is connected by link 120 to the control C which the pilot operates to vary the angles of incidence of the rotor blades, so that the indicator must move in conjunction with the said control. The sliding bar 25 is connected to one end of an adjustable composite tie-bar 31 through the lower part of a spring-loaded claw coupling 32 which can be pulled upwards relatively to its upper part in opposition to the spring to lift the sliding bar 25. The said coupling, however, acts as an integral part of the bar 31 when the latter is pulled upwards as described hereinafter. The upper end of the tie-bar 31 is connected to a laterally extending arm 125 fixed to the axis of the pointer 29. The coupling 32 is also provided with an external finger hook 32A whereby the part of the coupling attached to the bar 25 can be lifted, as mentioned above, without disturbing the part connected to the bar 31. A rest 33 is provided for supporting the lever 17A when the latter is in its inoperative position.

Whilst the aircraft is on the ground the rotor blades B are normally kept at their negative angles of incidence by suitably positioning the control lever C, so that the aircraft can be left standing quite safely even in a strong wind sufficient to cause the rotor blades to rotate, since, as the blades are at negative incidence, there is no danger of the blades being blown upwards or of the aircraft being lifted by the wind. Before the engine E is started, the pilot engages the aforesaid dog-clutch D and the starter pinion o by operation of the control member M (see members 32—33—35—36—53 and cables 31—37 of our co-pending application, Serial No. 33,397). With the engine E running slowly, he then pivots the hand lever 17A upwards, thereby engaging the friction clutch 6 through the connecting rod 15, spring coupling 16, bell-crank lever 12, rod 11 and lever 10, the spring 14 being tensioned. The starter pinion o, which is already engaged with its associated gear wheel on the rotor hub R, is now rotated through the said dog-clutch D, shafts 8 and 7, friction clutch 6, gear box 5, and shafts 4 and 2. In the meantime, the machine is held stationary by means of wheel brake (not shown) operated by rudder pedals X and the engine is then accelerated until the rotor attains a predetermined revolutions per minute as would lift the machine directly from the ground should the blades be moved to a positive angle of incidence.

During the upward movement of the hand lever 17A, the corner 28 on the pawl 21 will have engaged behind one of the teeth 20 on the ratchet member 17, thereby acting to hold the lever 17A in the position in which the friction clutch is engaged.

Now, with the parts as described and the speed of rotation of the rotor R being such as will lift the machine for direct take-off, the pilot pulls back the control lever C for varying the angles of incidence of the rotor blades B from its original negative incidence position into the position in which the blades will be in their maximum positive incidence positions and, at or about the same time, releases the brakes. The pointer 29, of course, moves in unison with the said control lever C by reason of the connecting link 120 and, in doing so, pulls up the slide bar 25 into the position (shown in Fig. 3 in broken lines) in which the corner 26 of the pawl is forced by the action of the spring-loaded lever 17A under the shoulder 27 on the bar 25, the pawl then being in the position shown in dotted lines 21A with its corner 28 clear of the ratchet teeth 20 and the lever 17ᵃ drops to its full-line position shown in Figures 1, 1ᵃ and 3. This movement of the bar 25 takes place when the incidence control lever C has moved a predetermined distance towards the position of maximum incidence, the distance being variable by making the composite tie bar 31 adjustable. By the dropping of the lever 17ᵃ, the friction clutch 6 is then disengaged under the action of the tension spring 14 and the lever 10, link 11, bell-crank 12, connecting rod 15, the ratchet member 17 and the lever 17A are all returned to their original positions. In the meantime, the pawl 21 will then return to its original position, shown in full lines, under the influence of the spring 24, leaving an unrestricted passage for the slide bar 25 when it is forced downwards as the incidence control lever is returned to the position corresponding to negative incidence on the rotor blades.

Not only is the friction clutch 6 disengaged when the incidence control has reached the predetermined incidence position in its movement towards positive incidence but, at about the same time as the clutch 6 is disengaged, the said dog-clutch D and the starter pinion o are also brought to their inoperative positions by operation of the control member M being actuated by link 120, lever arm 53, and link 36. There is thus a double safeguard against the rotor R being driven by the engine after the rotor blades have passed a selected point in their movement from negative to positive incidence positions.

It will be seen that by the use of the present invention it will be definitely impossible for the pilot to attempt to make the aircraft ascend without disconnecting the rotor from the engine, whereby safety is assured and the action of taking-off is considerably simplified. So long as the incidence control lever C remains on the positive incidence side of the point at which the clutch 6 is tripped, the clutch cannot be held engaged by the pawl 21. The lever 17A can be lifted and the clutch engaged but this would have no effect since the above mentioned dog-clutch D and starter pinion o are inoperative.

We claim:

1. In an aircraft of the kind referred to, means for varying the angles of incidence of the rotor blades, means for driving the rotor, and means connecting the angle varying means and means for driving the rotor and operated by the angle varying means for breaking the connection between the rotor and its driving means upon movement of the angle varying means to such a position as to adjust or set the blades to a predetermined angle of incidence.

2. In an aircraft of the kind referred to, mechanism for varying the angles of incidence of the rotor blades, a clutch connecting the rotor to a driving member, and common control means for both the incidence-varying mechanism and the clutch, arranged to control said incidence-varying mechanism and the clutch in unison, whereby when the incidence-varying mechanism has been adjusted into a predetermined position through operation of said common control it automatically brings about the release of the clutch control from the position in which it has acted to engage the clutch.

3. In an aircraft of the kind referred to, mechanism for varying the angles of incidence of the rotor blades, a control for actuating said mechanism, means for operatively interconnecting the rotor to a driving member, a clutch included in said means, a control for operating the clutch, means for retaining said clutch control in a position in which the clutch is engaged, and means for releasing said clutch control retaining means actuated by said incidence control.

4. In an aircraft of the kind referred to, mechanism for varying the angles of incidence of the rotor blades, a control for actuating said mechanism, means for operatively interconnecting the rotor to a driving member, a clutch included in said means, a control for operating the clutch, means for locking said clutch control in a position in which the clutch is engaged and means for releasing said locking means under the control of the incidence control.

5. In an aircraft of the kind referred to, mechanism for varying the angles of incidence of the rotor blades, a control for actuating said mechanism, means for operatively interconnecting the rotor to a driving member, a clutch included in said means, a control for operating the clutch, a catch or pawl adapted to engage the clutch control when the latter is in the position in which the clutch is engaged, said catch or pawl tending to move out of engagement with the clutch control, and means which normally holds the catch or pawl in a position to engage the clutch control, said last named means being interconnected with the incidence control in such a manner that when the latter is moved into a predetermined position said means is immediately moved in such a direction as to allow the catch or pawl to disengage the clutch control.

6. In an aircraft of the kind referred to, mechanism for varying the angles of incidence of the rotor blades, a control for actuating said mechanism, means for operatively interconnecting the rotor to a driving member, a clutch included in said means, a control for operating the clutch, and a pawl which is normally forced into a position in which it can engage a ratchet associated with the clutch control under the action of spring means, said pawl being supported normally in its ratchet-engaging position by a member which when moved in one direction by the movement of the incidence control allows the pawl to move into a position in which it can no longer engage the ratchet associated with the clutch control until said member has been returned into its original position.

7. A combination as claimed in claim 6, in which the pawl is mounted for movement towards and away from the ratchet in such a manner that in the event of the spring means breaking the pawl will immediately move into a position in which it cannot engage the ratchet.

8. A combination as claimed in claim 6, in which the member co-operating with the pawl consists of a slidable bar which is coupled to means operatively connecting it to the incidence control through a member which allows the said bar to be moved so as to render the pawl inoperative without disturbing the incidence control.

9. A combination as claimed in claim 2, in which there is included a spring-coupling in the clutch control to prevent harshness of engagement of the clutch.

10. In an aircraft of the kind referred to, the combination comprising mechanism for varying the angles of incidence of the rotor blades, a control for actuating said mechanism, means for operatively interconnecting the rotor to a driving member including a plurality of clutches, an independent control for each clutch and means interconnecting the incidence-varying control with said clutch controls in such a manner that when the incidence-varying control has been actuated to set the rotor blades into predetermined angles of incidence the clutches are automatically disengaged.

11. In an aircraft of the kind referred to, means for varying the angles of incidence of the rotor blades, mechanism for driving the rotor including a plurality of disconnectible means, and means connecting the incidence-varying means and the means for driving the rotor and arranged to break the connections between the rotor and its driving means automatically as soon as the blades have been adjusted or set to predetermined angles of incidence.

12. An aircraft of the kind in which the lift is derived wholly or partly from an overhead rotative wing whereby system or rotor, comprising in combination, means for driving the rotor, means for varying the angles of incidence of the rotor blades, and means operatively connecting the said angle-varying means and the means for driving the rotor and operable in response to movement of the blades by said angle-varying means to predetermined angles of incidence to disconnect the rotor from its driving means.

13. In an aircraft of the kind referred to, means for varying the angles of incidence of the rotor blades, mechanism for driving the rotor, means for disconnecting said mechanism from the rotor, and control means connected with said incidence-varying means and for said disconnecting means operated by said angle varying means to actuate said disconnecting means in response to a given degree of movement of the angle varying means corresponding to a predetermined angle of incidence, whereby as soon as the rotor blades have been adjusted into predetermined angles of incidence the said disconnecting means is operated to render the driving mechanism ineffective to drive the rotor.

14. In an aircraft, a sustaining rotor including autorotatable blades and means for varying the pitch between a substantially no-lift pitch and a positive pitch, driving means for overspeeding the rotor prior to take-off with the blades in no-lift pitch, means for disconnecting the driving means, means for progressively and controllably raising the blade pitch for direct take-off, and means effecting a sequential operation of the last two mentioned means.

15. In an aircraft of the kind described, a sustaining rotor having autorotative rotor blades, mechanism including a clutch for driving said blades during the running-up period, mechanism for varying the pitch-angles of the blades, a control for operating said clutch, means for holding the clutch control in the clutch-engaging position, and means operatively interconnecting the pitch angle changing mechanism and the clutch control so that operation of the pitch angle changing mechanism to increase the pitch angles will bring about the return of said clutch control to the position in which said clutch is disengaged.

16. In an aircraft as claimed in claim 15, wherein the mechanism interconnecting the pitch angle changing mechanism and the clutch control includes a spring pressed member.

17. In an aircraft as claimed in claim 15, wherein the mechanism interconnecting the pitch angle changing mechanism and the clutch control includes a catch adapted to engage with the clutch control when the latter is in the clutch-engaging position and wherein means are provided for holding the catch in a position to engage the clutch control, said means having to be operated before the clutch control can be released.

18. In an aircraft as claimed in claim 15, wherein the mechanism interconnecting the pitch angle changing mechanism and the clutch control includes a member which when removed from engagement with the clutch control permits the pitch angle changing mechanism to be actuated so that the change over from negative or zero pitch angle to positive pitch angle can be timed.

19. In an aircraft of the kind described, a rotor having variable incidence blades, means for varying the incidence of said blades, and a control therefor, a power drive for said rotor, disconnectible means in said drive, a control for at least engaging said disconnectible means, and a manual control operable to disengage said disconnectible means when it is desired, to actuate the control of the incidence varying means to bring the blades from a no-lift to a flying position.

20. In an aircraft of the kind described, a sustaining rotor comprising auto-rotative and incidence variable wings or blades, disconnectable means for driving the rotor including a clutch, mechanical means for changing the pitch angle of the rotor blades, including a device operative to effect an increase of blade pitch in a predetermined timed relation with the disengagement of the clutch.

21. In an aircraft as set forth in claim 20 wherein said device is operative only on the pitch changing mechanism and is inoperative to regulate the rate of disengagement of the clutch.

22. An aircraft of the kind in which the lift is derived wholly or partly from an overhead rotative wing or blade system or rotor, comprising in combination a rotor, blades connected with the rotor, means for driving the rotor, means for varying the angles of incidence of the rotor blades, and means connecting the said angle-varying means and the means for driving the rotor to disconnect the rotor from said driving means, in response to movement of said angle-varying means to move the blades to predetermined angles of incidence, the incidence varying means being under manual operation and control.

JOHN WILLIAM DYER.
DAVID KAY.